Feb. 1, 1966      H. F. VON WIMMERSPERG      3,232,665
SAFETY DEVICE FOR CHILDREN IN VEHICLES
Filed Jan. 21, 1963
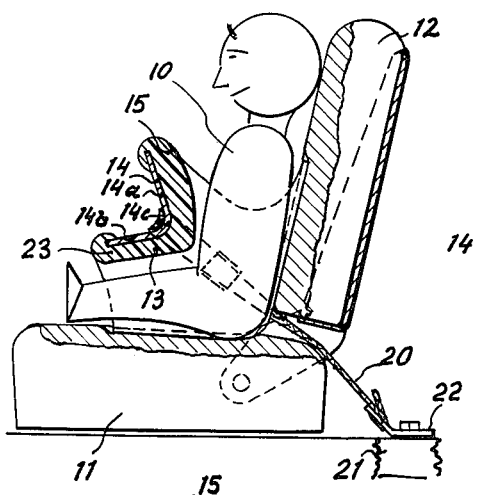
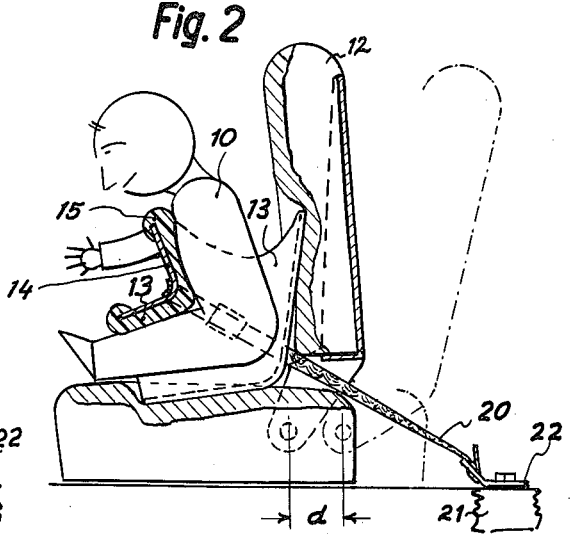
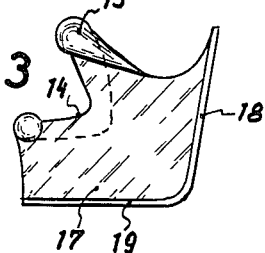
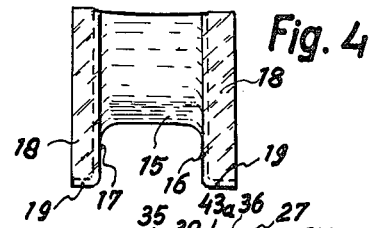
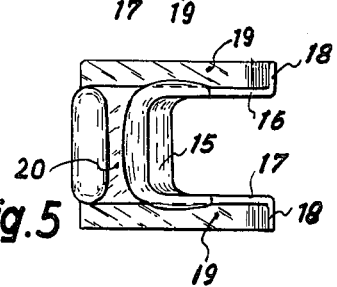
INVENTOR.
Heinrich F. von Wimmersperg
BY
Barnes, Kisselle, Raisch & Choate
ATTORNEYS

United States Patent Office 3,232,665
Patented Feb. 1, 1966

3,232,665
SAFETY DEVICE FOR CHILDREN IN VEHICLES
Heinrich F. Von Wimmersperg, 15929 Grand River Ave.,
Detroit, Mich.
Filed Jan. 21, 1963, Ser. No. 252,775
2 Claims. (Cl. 297—385)

The invention relates to safety devices for children sitting in automobiles, airplanes or other vehicles.

A safety device for children sitting in cars, especially on the front seat of the car, has to meet two main requirements. First, the device has to distribute the child's kinetic energy due to the vehicle's forward motion unto a large area of the lap, chest and preferably also shoulders, as the delicate body structure cannot absorb high impact loads in a small area. Second, it has to protect the child from impacts of other masses, especially of the seat and back rest.

A tiltable back rest of a vehicle seat continues unrestrained in motion in a crash, swinging downwards violently. The structure of the so-called rigid back rest is often not strong enough to stand very fast deceleration in a crash. Therefore, it is not practical to anchor safety devices for children directly to the back rest of a vehicle seat. Even a belt loop wrapped around the back rest and fastened to the conventional belt anchorage below and behind the back rest on the floor of the car does not prevent a break-down of a rigid back rest in a crash, as the angle of the belt is almost perpendicular to the direction of the car movement.

The seat adjusting device of a passenger car is not strong enough to absorb the high impact loads of an emergency deceleration. The seat very often jumps over the ratchet or other adjusting structure to its most forward position. Sometimes the seat itself breaks loose completely. Heavy masses behind the front seat, such as luggage, etc. increase the danger proportionally.

In the event of a rapid deceleration, such as occurs in a vehicle collision, a child sitting on the front seat of the vehicle with a tiltable back rest, using a conventional lap belt is frequently injured seriously. This is due to several combined actions. First, the child has to absorb his own kinetic energy on the small belt area. Then, the back rest swings violently down on the jack knifing child and absorbs its own energy by striking the child. Further, as the seat jumps the adjustment mechanism, it adds part of its energy to the kinetic energy of the back rest which is also absorbed by further compressing the child. All this kinetic energy has to be absorbed by deformation of the child's body. Both the back rest and seat are usually heavier than the child and consequently have a proportionally higher kinetic energy. The three impacts described follow each so closely in time that the deformation of the child is a continuous process without any recuperation time in between.

In a crash, an unrestrained child has to deaden only his own energy, but does it mostly by hitting unyielding car structure with the most vulnerable part, his head.

In a car with a tiltable or poorly supported back rest, and seat which can jump the adjustment device, the child restrained by a conventional lap belt has to survive in a severe emergency deceleration a force greater than his own kinetic energy, but by impact of a less vulnerable part. However, injuries to the spine or internal organs can be just as severe as head injuries.

A child's seat hooked over the top of a tiltable back rest propels the head of the child directly toward the dash board in the event of a sudden deceleration. A child's seat hooked over the top of a rigid back rest is somewhat safer, but only to a very limited extent because the hook structure of the child's seat is usually flimsy and easily bent in the event of a crash, so that the child's seat and the child are both thrown into the windshield. As in crash deceleration, vertical forces very often occur, a hook as means of support is in no way adequate for securing a child's seat.

The main object of the invention is to provide a safety device for a child sitting on the seat of a vehicle, which distributes the impact forces of deceleration over a large area of the child's body.

Another object is to provide such a device which can be conveniently fastened and removed.

A further object is to provide a safety device which restrains the relative forward movement of the seat and its back rest in an emergency deceleration.

A further object of the invention is to provide a safety device for children which can also be used as a child seat outside of the car.

The novel features that I consider characteristic of my invention are set forth with particularity in the appended claims. Further objects of the invention and novel features of the construction will be apparent when considered together with the accompanying drawings, in which FIG. 1 is a side view, partly in section, of a vehicle seat with one embodiment of the safety device of this invention thereon under normal driving conditions.

FIG. 2 is a view similar to FIG. 1, showing the action in emergency deceleration.

FIG. 3 shows a side view of the safety device.

FIG. 4 is a rear view of the safety device.

FIG. 5 is a top view of the safety device.

FIG. 6 is a fragmentary perspective view of another embodiment of the safety device of the present invention.

Referring first to FIGS. 1 and 2, a child 10 is shown seated on the seat 11 of a vehicle resting against the back rest 12. The safety device of the present invention comprises a shell 13 placed over the child. Shell 13 has a front wall 14 with the heavy padding 15, and side walls 16, 17 with the flanges 18, 19 extending along the rear and bottom edges, respectively, of the front wall. Front wall 14 has a vertical portion 14a and a horizontal portion 14b connected by a rounded corner 14c. The loop of the belt 20 extends around the outside of the front wall 14 across corner 14c and the ends of the belt are secured to the car frame 21 by brackets 22. The inside of the shell 13 is large enough to keep the child free from the pull of the belt 20 when it is tightened (FIG. 1). Shell 13 is open at the back and bottom thereof so that it can be conveniently placed over the sitting child. In the operative position, the padded wall portion 14a is spaced forwardly of the child's chest and the wall portion 14c overlies the child's lap.

In an emergency deceleration, the child is pressed against pad 15 of the front wall 14, which distributes the impact forces over a large body area as is clearly shown in FIG. 2. The lower part 14c of the front wall 14 in coaction with the seat prevents the child from moving too far upwards. The flanges 18 keep the back rest 12 away from the child and also restrain the seat in its forward movement. FIG. 2 also shows stretching of the belt 20 under the combined impact of the child 10, the back rest 12 and the seat 11 on the shell 13 when the seat moves for the distance "d." As the belt works on a relatively small angle in regard to the direction of car movement, the transmission of the forces is almost direct. With this safety device, the child has to survive only its own impact forces, distributing his kinetic energy over a relatively large area of his body by reason of the padded wall 14. The child is completely free from the impact of the back rest and seat (and in some cases luggage). The child can not hit the dash board.

The shell 13 is preferably made from light metal or impact resistant plastic material, and is preferably padded with a low-memory foam material.

FIG. 6 shows another embodiment of the safety device of this invention. The impact absorbing element is a strong sheet or panel of fabric 24 with four ring shaped fasteners 25, 26, 27, 28 on its reinforced corners, which are secured to upwardly inclined legs 29, 30 of frame 31 by peg-like fasteners 32, 33, 34, 35, 36, 37, 38, 39. The vertical legs 40, 41 of tubular frame 31 are fastened to the horizontal legs 42, 43 by rivets or otherwise. The cross strut 44 rigidly joins the horizontal legs 42, 43 and the cross strut 43a connects the inclined legs 29, 30 of the frame. The belt 45, when tightened to the car frame as in the first embodiment, imparts a V-shape form to the fabric sheet 24 as shown in FIG. 6 such that the horizontal portions of sheet 24 overlies the child's lap and the vertical portions are spaced forwardly of the child's chest.

In use, cross strut 44 is inserted between the lower edge of the back rest and the seat cushion after the child is placed between fabric sheet 24 and the back rest. Legs 42, 43 rest on the seat and legs 40, 41 contact the back rest. By pulling the belt tight, a firm contact is established between the tubular frame work and the seat and back rest. The legs of the child are covered and protected by the lower part 24$^x$ of the fabric sheet. By tightening belt 45, a somewhat elastic impact absorbing area is established, comparable with the pad 15 of the embodiment illustrated in FIGS. 1 through 5. Frame 31 restrains the seat and back rest in their forward movement in a crash and keeps the child's body free from them in substantially the same manner as described previously in connection with shell 13. With the embodiment shown in FIG. 6, the location of belt 45 can be adjusted upwardly and downwardly of fabric panel 24 to suit the size and contour of the seated child.

Upper rings 27, 28 can be shifted rearwardly over the pegs 37, 38 until they contact the pegs 46, 47. Then the fabric sheet 24 can be used as a child's seat as is illustrated by the broken line showing in FIG. 6.

Both embodiments of the safety device herein disclosed can be successfully used in combination with the arrangement shown in my United States Patent No. 2,947,353.

It is of course understood that tubular frame 31 can be constructed such that it can be taken apart or collapsed, in order to make it more convenient for transportation.

Although I have described my invention with a certain degree of particularity, it is understood that the present disclosure has been only by way of example and that numerous changes in the details of construction and the combination of parts may be restored to without departing from the spirit and the scope of the invention as hereinafter claimed.

I claim:

1. In a vehicle of the type having a frame and a seat, the combination comprising a rigid child retaining frame having a pair of upright side members which are interconnected in spaced relation, said side members each having generally upright rear portions adapted to engage and bear against the back rest of the vehicle seat, and generally horizontal bottom portions resting on the vehicle seat cushion, said rigid frame also having a generally rigid panel section extending transversely between the side members and connected thereto, said panel section being generally L-shaped in vertical section and being comprised of a generally vertical portion and a generally horizontal portion and being spaced forwardly and upwardly of the rear and bottom portions of the side members so that it extends transversely across and forms a relatively large impact area immediately in front of the chest and immediately above the lap of a child arranged in a seated position on the vehicle seat between the side members and a belt member extending downwardly and rearwardly from said rigid frame and anchored to the frame of the vehicle.

2. A safety device for use with a vehicle seat to protect a child against injury in the event of a sudden deceleration of the vehicle comprising a rigid frame having upright side members which are interconnected in spaced apart relation, said side members each having a generally horizontally extending bottom portion adapted to support the frame on the cushion of a vehicle seat and a generally upright rear portion adapted to engage and bear against the back rest of a vehicle seat, the back and bottom of said frame being generally open, said frame also having a panel section extending transversely between the side members, said panel section comprising a generally upright portion and a generally horizontal portion, the upright portion being spaced forwardly from the upright rear portion of the rigid frame a distance slightly greater than the child's body dimension from front to back in the region of the chest, and said generally horizontal portion being spaced above the generally horizontally extending bottom portions of the frame a distance slightly greater than the child's lap height in a seated position such that the panel section overlies the chest and lap of a child arranged in a seated position on the vehicle seat between said side members and means for anchoring said frame to a portion of the vehicle and adapted to prevent substantial forward and upward movement of the frame relative to the vehicle upon sudden deceleration of the vehicle.

References Cited by the Examiner

UNITED STATES PATENTS

| | | | |
|---|---|---|---|
| 2,404,108 | 7/1946 | Stauffacher | 297—385 |
| 2,726,714 | 12/1955 | McAndrews | 297—387 |
| 2,777,502 | 1/1957 | Travis | 297—386 |
| 2,947,353 | 8/1960 | Wimmersperg | 297—385 |

FRANK B. SHERRY, *Primary Examiner.*

J. S. PETRIE, *Assistant Examiner.*